(12) United States Patent
Anderson

(10) Patent No.: US 10,915,161 B2
(45) Date of Patent: Feb. 9, 2021

(54) FACILITATING DYNAMIC NON-VISUAL MARKERS FOR AUGMENTED REALITY ON COMPUTING DEVICES

(71) Applicant: INTEL CORPORATION, Santa Clara, CA (US)

(72) Inventor: Glen J. Anderson, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/567,712

(22) Filed: Dec. 11, 2014

(65) Prior Publication Data

US 2016/0171767 A1  Jun. 16, 2016

(51) Int. Cl.
*G06T 19/00* (2011.01)
*G06F 3/01* (2006.01)

(52) U.S. Cl.
CPC .................................... *G06F 3/011* (2013.01)

(58) Field of Classification Search
CPC ............ G06T 19/00; G09G 5/00; H04N 5/33; H04W 4/00; G06F 3/011
USPC ......................................................... 345/633
See application file for complete search history.

(56) References Cited

U.S. PATENT DOCUMENTS

| 8,571,263 | B2 * | 10/2013 | Shotton .................. G06F 3/017 345/633 |
| 8,749,396 | B2 | 6/2014 | Maggiore |
| 9,292,085 | B2 * | 3/2016 | Bennett ................... G06F 3/012 |

| 2012/0093320 | A1 * | 4/2012 | Flaks ...................... H04S 7/301 381/17 |
| 2012/0263154 | A1 * | 10/2012 | Blanchflower ... G06F 17/30247 370/338 |
| 2012/0263155 | A1 | 10/2012 | Blanchflower et al. |
| 2012/0327119 | A1 * | 12/2012 | Woo ........................ G06F 3/147 345/633 |

(Continued)

FOREIGN PATENT DOCUMENTS

| CN | 102799761 | 11/2012 |
| CN | 103793063 | 5/2014 |
| CN | 104054039 | 9/2014 |

OTHER PUBLICATIONS

Ruiwei Shen et al., "A System for Visualizing Sound Source Using Augmented Reality," Advances in Mobile Computing & Mutlimedia, ACM Dec. 3, 2012, pp. 97-102 (Year: 2012).*

(Continued)

*Primary Examiner* — Michael Le
(74) *Attorney, Agent, or Firm* — Hanley, Flight & Zimmerman, LLC

(57) ABSTRACT

A mechanism is described for facilitating dynamic rendering of non-visual marker-based augmented reality experiences on computing devices according to one embodiment. A method of embodiments, as described herein, includes detecting non-visual data. The non-visual data may be captured via one or more capturing/sensing components of a computing device. The method may further include mapping the non-visual data with one or more augmented reality items to generate a first augmented reality experience, wherein the non-visual data is converted into one or more non-visual markers based on the one or more augmented reality items and one or more contexts, and rendering the first augmented reality experience based on the one or more non-visual markers.

24 Claims, 6 Drawing Sheets

(56) References Cited

U.S. PATENT DOCUMENTS

| | | | | |
|---|---|---|---|---|
| 2013/0024774 A1* | 1/2013 | Basso | .............. | H04N 21/44012 715/733 |
| 2013/0169626 A1* | 7/2013 | Balan | .................... | G06T 19/006 345/419 |
| 2013/0182858 A1* | 7/2013 | You | ......................... | G06F 3/011 381/58 |
| 2014/0028712 A1* | 1/2014 | Keating | ................ | G06T 19/006 345/633 |
| 2014/0129207 A1* | 5/2014 | Bailey | ..................... | G06F 40/58 704/2 |
| 2014/0188669 A1* | 7/2014 | Freeman | ............ | G06Q 30/0643 705/27.2 |
| 2014/0232749 A1 | 8/2014 | Park et al. | | |

OTHER PUBLICATIONS

PCT International Search Report for PCT/US2015/057335 dated Feb. 24, 2016.
PCT Written Opinion of the International Searching Authority for PCT/US2015/057335 dated Feb. 24, 2016.
PCT International Preliminary Report on Patentability for PCT/US2015/057335 dated Jun. 13, 2017.
European Patent Application No. 15867046.3, Extended Search Report, Apr. 30, 2018, 14 pgs.
Ruiwei Shen et al., "A System for Visualizing Sound Source Using Augmented Reality," Advances in Mobile Computing & Mutlimedia, ACM Dec. 3, 2012, pp. 97-102.
Franco Mazzenga et al., "Applications of Smart Tagged RFID Tapes for Localization Services in Historical and Cultural Heritage Environments," Enabling Technologies: Infrastructures for Collaborative Enterprises (WETICE), Jun. 28, 2010, pp. 186-191.
National Intellectual Property of Administration, P.R. China, "Third Office Action," issued on connection with application No. 201580061697.6, dated Aug. 12, 2020, 8 pages.
National Intellectual Property of Administration, P.R. China, "Second Office Action," issued on connection with application No. 201580061697.6, dated Apr. 1, 2020, 8 pages.
National Intellectual Property of Administration, P.R. China, "First Office Action," issued on connection with application No. 201580061697.6, dated Oct. 21, 2019, 19 pages.

* cited by examiner

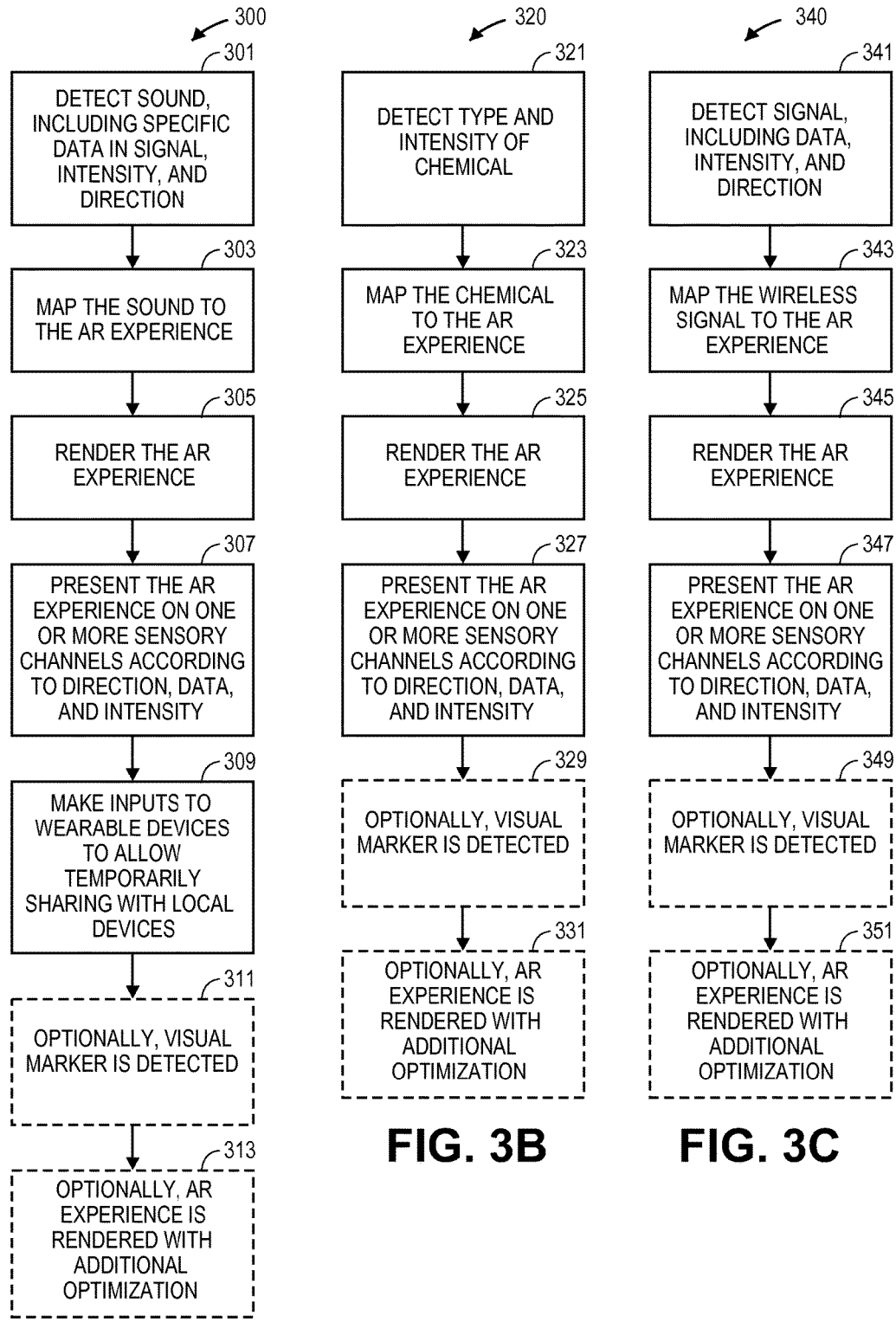

FACILITATING DYNAMIC NON-VISUAL MARKERS FOR AUGMENTED REALITY ON COMPUTING DEVICES

FIELD

Embodiments described herein generally relate to computers. More particularly, embodiments relate to facilitating dynamic non-visual markers for augmented reality on computing devices.

BACKGROUND

With the increasing use of computing devices, such as mobile computing devices, both virtual reality and augmented reality (AR) are becoming increasingly important for users with regard to various applications and processes. However, conventional techniques relating to AR are significantly limited as they require having a visual fiducial marker or contour recognition for achieving anchoring of an image within the scene which significantly restricts the uses and potential benefits of AR.

BRIEF DESCRIPTION OF THE DRAWINGS

Embodiments are illustrated by way of example, and not by way of limitation, in the figures of the accompanying drawings in which like reference numerals refer to similar elements.

FIG. 3A illustrates a method for facilitating generating and rendering of augmented reality experiences based on non-visual markers, such as audio, according to one embodiment.

FIG. 3B illustrates a method for facilitating generating and rendering of augmented reality experiences based on non-visual markers, such as chemicals, according to one embodiment.

FIG. 3C illustrates a method for facilitating generating and rendering of augmented reality experiences based on non-visual markers, such as wireless signals, according to one embodiment.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for introducing and using any number and type of non-visual markers (also referred to as "fiducial markers", "contours", or simply "anchors") to enhance the use and experiences relating to AR on computing devices. For example and in some embodiments, the non-visual markers may be based on and include (without limitation) audio streams (e.g., sound, noise, vibration, ultrasound, etc.), radio waves (e.g., signals, such as wireless signals having data, metadata, etc.), chemicals (e.g., chemical changes or properties in the environment, etc.), and/or the like.

Embodiments provide for obtaining and applying non-visual markers (e.g., sounds, chemical, radio waves, etc.) to trigger and anchor user AR experiences.

Embodiments further provide for using one or more of the aforementioned non-visual markers in combination with one or more visual markers (which may be obtained using non-visual data capturing devices, such as a signal detector/sensor, etc., as opposed to visual data capturing devices, such a camera, etc.) to further enhance users' AR experiences. It is contemplated that head-mounted displays (HMDs) are allowing AR experiences in a much more comfortable and immersive way; however, as aforementioned, conventional techniques continue to rely entirely on visual markers and visual data detection devices for recognition of items or features in visual scenes which significantly restricts the user's AR experiences.

Figure 1:
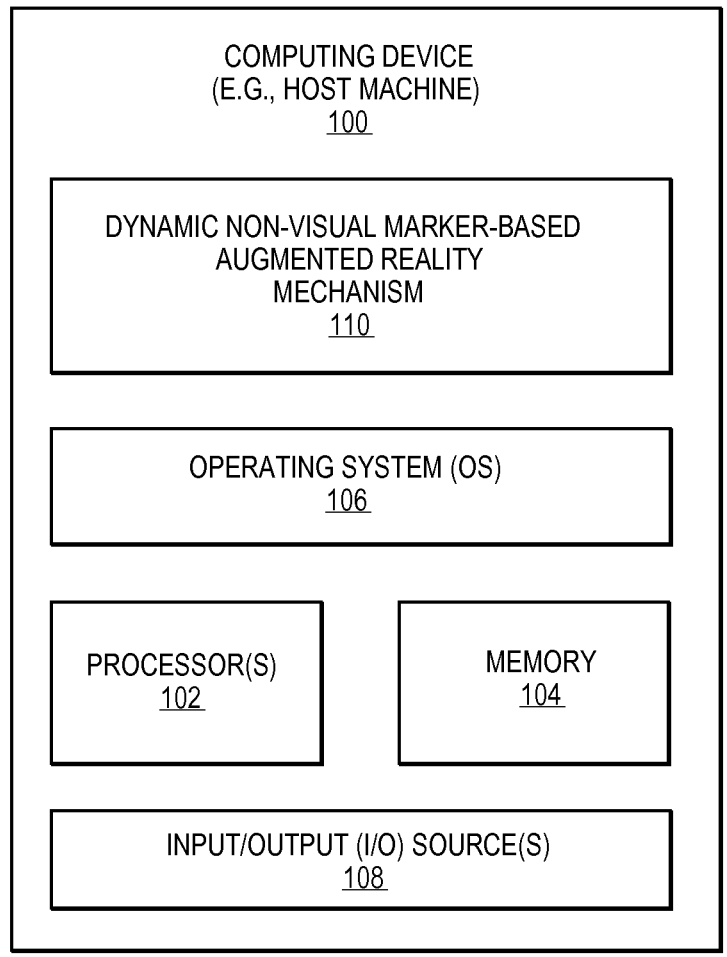
FIG. 1 illustrates a computing device employing a dynamic non-visual marker-based augmented reality mechanism according to one embodiment.

FIG. 1 illustrates a computing device 100 employing a dynamic non-visual marker-based augmented reality mechanism 110 according to one embodiment. Computing device 100 serves as a host machine for hosting dynamic non-visual marker-based augmented reality mechanism ("AR mechanism") 110 that includes any number and type of components, as illustrated in FIG. 2, to efficiently employ and use non-visual markers in achieving and enhancing AR experiences as will be further described throughout this document.

Computing device 100 may include any number and type of communication devices, such as large computing systems, such as server computers, desktop computers, etc., and may further include set-top boxes (e.g., Internet-based cable television set-top boxes, etc.), global positioning system ("GPS")-based devices, etc. Computing device 100 may include mobile computing devices serving as communication devices, such as cellular phones including smartphones, personal digital assistants ("PDAs"), tablet computers, laptop computers (e.g., Ultrabook™ system, etc.), e-readers, media internet devices ("MIDs"), smart televisions, television platforms, intelligent devices, computing dust, media players, wearable devices (e.g., wearable glass, smartwatch, bracelet, smartcard, jewelry, clothing items, etc.), media players, etc.

Computing device 100 may include an operating system ("OS") 106 serving as an interface between hardware and/or physical resources of the computer device 100 and a user. Computing device 100 further includes one or more processors 102, memory devices 104, network devices, drivers, or the like, as well as input/output ("I/O") sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

Figure 2A:
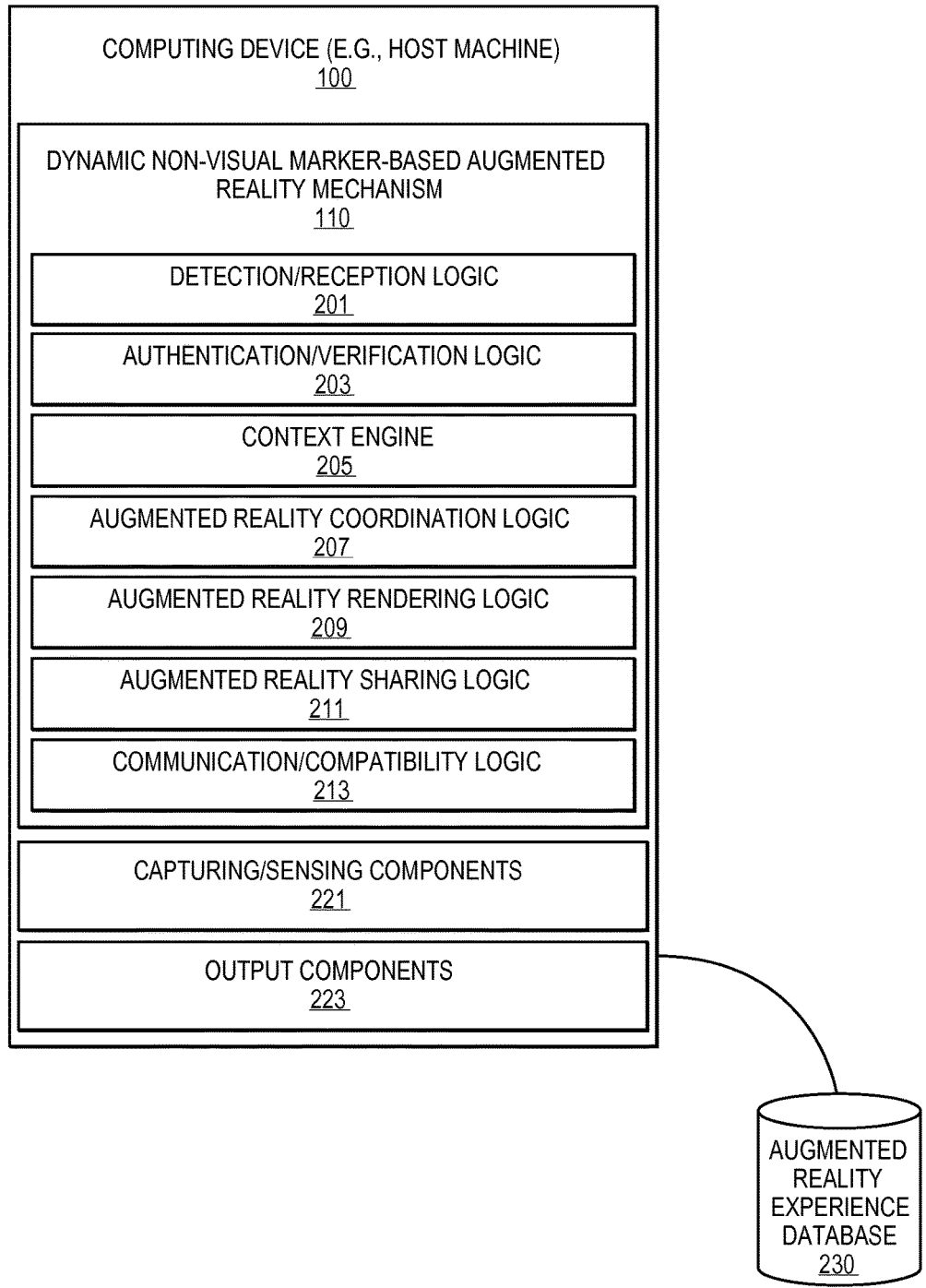
FIG. 2A illustrates a dynamic non-visual marker-based augmented reality mechanism according to one embodiment.

FIG. 2A illustrates a dynamic non-visual marker-based augmented reality mechanism 110 according to one embodiment. In one embodiment, dynamic non-visual marker-based augmented reality mechanism 110 may include any number and type of components, such as (without limitation): detection/reception logic 201; authentication/verification logic 203; context engine 205; augmented reality coordination logic 207; augmented reality rendering logic 209; augmented reality sharing logic 211; and communication/compatibility logic 213. Computing device 100 further includes capturing/sensing components 221 and output components 223.

Capturing/sensing components 221 may include any number and type of capturing/sensing devices, such as one or more sending and/or capturing devices (e.g., cameras, microphones, biometric sensors, chemical detectors, signal detectors, wave detectors, force sensors (e.g., accelerometers), illuminators, etc.) that may be used for capturing any amount and type of visual data, such as images (e.g., photos, videos, movies, audio/video streams, etc.), and non-visual data, such as audio streams (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), environmental/weather conditions, maps, etc. It is contemplated that "sensor" and "detector" may be referenced interchangeably throughout this document. It is further contemplated that one or more capturing/sensing devices 221 may further include one or more supporting or supplemental devices for capturing and/or sensing of data, such as illuminators (e.g., infrared ("IR") illuminator), light fixtures, generators, sound blockers, etc. It is to be noted that "visual data" may be referred to as "visual" or "visuals"; while, "non-visual data" may be referred to as "non-visual" or "non-visuals" throughout this document.

It is further contemplated that in one embodiment, capturing/sensing components 221 may further include any number and type of sensing devices or sensors (e.g., linear accelerometer) for sensing or detecting any number and type of contexts (e.g., estimating horizon, linear acceleration, etc., relating to a mobile computing device, etc.) which may then be used by AR mechanism 110 to perform one or more tasks relating to torsion estimation and such for accurate eye tracking as will be further described throughout this document. For example, capturing/sensing components 221 may include any number and type of sensors, such as (without limitations): accelerometers (e.g., linear accelerometer to measure linear acceleration, etc.); inertial devices (e.g., inertial accelerometers, inertial gyroscopes, micro-electromechanical systems ("MEMS") gyroscopes, inertial navigators, etc.); gravity gradiometers to study and measure variations in gravitation acceleration due to gravity, etc. It is further contemplated that a source of an audio signal may be estimated by audio analysis of audio waves detected by a microphone or by an array of microphones. AR mechanism 110 may then position or anchor the augmented reality output relative to the estimated source of the audio.

For example, capturing/sensing components 221 may further include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system ("GPS") sensors; resource requestor; and trusted execution environment ("TEE") logic. TEE logic may be employed separately or be part of resource requestor and/or an I/O subsystem, etc.

Computing device 100 may further include one or more output components 223 to remain in communication with one or more capturing/sensing components 221 and one or more components of AR mechanism 110 to facilitate displaying of images, playing or visualization of sounds, displaying visualization of fingerprints, presenting visualization of touch, smell, and/or other sense-related experiences, etc. For example and in one embodiment, output components 223 may include (without limitation) one or more of display devices or screens, audio speakers, bone conducting speakers, olfactory or smell visual and/or non/visual presentation devices, haptic or touch visual and/or non-visual presentation devices, animation display devices, biometric display devices, X-ray display devices, etc.

Computing device 100 may include a mobile computing device (e.g., smartphone, tablet computer, wearable glasses, watches, smart windows, etc.) which may be in communication with one or more repositories or databases, such as augmented reality database 230, where any amount and type of data (e.g., AR experience data, AR real-time and historical contents, metadata, etc.) may be stored and maintained along with any amount and type of other information and data sources, such as resources, policies, etc., may be stored. Further, computing device 100 may be in communication with any number and type of other computing devices, such as desktop computer, laptop computer, mobile computing device, such as a smartphone, a tablet computer, wearable glasses, watches, etc., over one or more networks, such as cloud network, the Internet, intranet, Internet of Things ("IoT"), proximity network, Bluetooth, etc.

In the illustrated embodiment, computing device 100 is shown as AR mechanism 110; however, it is contemplated that embodiments are not limited as such and that in another embodiment, AR mechanism 110 may be entirely or partially hosted by multiple devices, such as multiple client computers or a combination of server and client computer, etc. However, throughout this document, for the sake of brevity, clarity, and ease of understanding, AR mechanism 100 is shown as being hosted by computing device 100.

It is contemplated that computing device 100 may include one or more software applications (e.g., website, business application, mobile device application, etc.) in communication with AR mechanism 110, where a software application may offer one or more user interfaces (e.g., web user interface (WUI), graphical user interface (GUI), touchscreen, etc.) to work with and/or facilitate one or more operations or functionalities of AR mechanism 110.

In one embodiment, any number and type of non-visual markers, such as audio (e.g., vibration, ultrasound, etc.), etc., may be used to trigger an AR experience via AR mechanism 110, which are at first detected by one or more capturing/sensing components 221. For example, just as visual data may be captured by a camera, non-visual data, such as a sound, may be captured via a microphone, where the visual data and the non-visual data may then be applied and used as visual markers and non-visual markers, respectively. Similarly, other non-visual data, such as chemical changes/properties, radio waves, fingerprints, etc., may be captured via one or more sensors (e.g., force sensor, such as an accelerometer) of capturing/sensing components 221, where the non-visual data may then be used as non-visual markers.

Once the non-visual data is detected to serve as one or more potential non-visual markers, the non-visual data may be processed by authentication/verification logic 203. For example, a sound or a signal may be authenticated and verified in terms of its source of origin, transmission, etc., such as whether the audio was initiated or transmitted a person (e.g., scream, singing, etc.), an animal (e.g., dog barking, cat meowing, etc.) a device (e.g., radio playing a song or an announcement, computing device playing a video game, etc.), a thing/environment (e.g., train passing by, plane taking off, tree shuffling in a jungle, rain falling in the streets, etc.), and/or the like. In some embodiments, when a device, such as a computing device, an access point, etc., is involved in the origin or transmission of non-visual data, such as an audio, authentication/verification logic 203 may also be used to authenticate and verify the device before the non-visual data may be accepted to serve as a non-visual marker in order to avoid any unwanted contents, such as viruses, malware, bugs, etc.

Similarly, other forms of non-visual data, such as chemical properties (e.g., humidity, heat, cold, etc.), biometric properties (e.g., fingerprints, body temperature, etc.), and/or the like, may also be authenticated and verified by authentication/verification logic 203. In some embodiments, certain non-visual data, such as radio waves, etc., may not have any authentication connection and thus need to be authenticated or verified.

In one embodiment, context engine 205 may be used to provide a proper context for visual and/or non-visual data such that the data may properly serve as one or more markers in enhancing and providing AR to the user. For example, in one embodiment, context engine 205 may provide a proper context of a sound, etc., with regard to the other environmental factors, background audio, AR experiences as extracted from AR database 230, etc. For example, if a sound of a lion's roar is captured by a microphone, context engine 205 may then be used to provide a proper context to the roar by analyzing any other sounds, chemical properties, even visuals, etc., picked up by one or more capturing/sensing components 221. For example, certain sounds (e.g., humans talking, birds chirping, vehicles passing, etc.), chemical properties (e.g., humidity, temperature, etc.), visuals (such as capturing humans, animals, trees, streets, parking lot, cages, etc.) may be used by context engine 205 to determine and provide a proper context as to whether the lion was roaring in a cage in a zoo or running free in a jungle.

As aforementioned, in some embodiments, visual markers may also be used along with non-visual markers and that embodiments are not limited to merely the non-visual markers. For example, as described in the previous example, one or more visual markers may be obtained and combined with one or more non-visual markers, as necessitated or desired, to provide an anchor in augmented reality that is based on a combination of visual and non-visual markers which is further based on a combination of the visual and non-visual data obtained through one or more of capturing/sensing components 221.

For example, computing device 100 may include a mobile computing device (e.g., smartphone, tablet computer, etc.), wearable device (e.g., watches, wearable glasses, other HMDs, etc.), etc., where one of more capturing sensing components 221 of computer device 100 may capture one or more visual (e.g., images, etc.) and/or non-visual data (e.g., audio, signals, waves, etc.), such as one or more signals, chemical properties, etc. Although, as aforementioned, embodiments are not limited to non-visual data or markers, for the sake of brevity, clarity, and ease of understanding, most of the discussion in this document may focus on non-visual data/markers. Referring back to the capturing of non-visual data (e.g., audio, signals, chemical properties, biometric properties, radio waves, etc.), the captured non-visual data may be detected or received by detection/reception logic 201, authenticated and verified by authentication/verification logic 203, and then evaluated or analyzed by context engine 205 such that appropriate context may be allocated to each item of data within the captured non-visual data.

In one embodiment, upon allocating context to the non-visual data (such as the lion is roaring in a jungle as opposed to in a zoo), this allocated context and any other specific data/metadata (e.g., time of the day/year, user name, part of the world, etc.), instructions (e.g., AR to be displayed in three-dimension (3D), etc.), and/or the like, relating to the non-visual data may be considered by AR coordination logic 207 to extract appropriate AR experience content from AR database 230. For example, the aforementioned AR experience content may include animation characters (e.g., Mickey Mouse™), two-dimension (2D) and/or 3D models, preferences or historical behavior relating to the user of computing device 100 (e.g., preferred language, preferred font size of the text, black and white final display of AR as opposed it being in color, etc.), and/or the like.

Further, for example, in case of non-visual data, such as one or more signals, AR experience may be presented to the user via one or more sensory channels (e.g., visual, auditory, olfactory, haptic, etc.). A relatively simple example may be of a park appearing all around the user when the user's computing device 100 (e.g., mobile computing device) detects a single piece of audio (e.g., bird chirping, river streaming, etc.). Similarly, continuing with the simple example, a more complex example may be that of busier environment, such as a jungle, appearing all around the user having computing device 100 where any number and type of sounds (e.g., animals roaring, birds chirping, rivers streaming, winds blowing, trees shrugging, rain falling, etc.) may be picked up by one or more microphones of capturing/sensing components 221.

Further, detection/reception logic 201 may detect the direction of these multiple and overlapping sounds and allow for context engine 205 to determine their context (e.g., direction of the origin, travel, and/or destination of each of the multiple sounds, etc.) to then allow AR coordination logic 207 work with AR database 230 for placement of key features within the relevant AR experience to further place the detected non-visual data (with or without any visual data) as non-visual markers to serve as anchors for the user's AR experience being provided via one or more output components 223 of computing device 100. Similarly, for example, another non-visual data (e.g., chemical property, such as water vapor being caused by the falling rain) may be used by one or more of context engine 205, AR coordination logic 207, AR database 230, etc., to further alter the level or intensity of the rain appearing in the user's AR experience on computing device 200 as facilitated by AR rending logic 209.

In one embodiment, the user's AR experience, once prepared by AR coordination logic 207, may then be rendered by AR rendering logic 209. For example, upon preparing the AR experience to be presented to the user, AR rendering logic 209 may finalize the AR experience, such as in terms of identifying and choosing one or more output components 223 that be used to present the AR rendering logic 209. For example and in one embodiment, the user's AR experience may be rendered in real-time/runtime, such as an audio sound may be presented via an audio speaker of output components 223 and similarly, other portions of the AR experience may be presented via other appropriate presentation devices of output components 223, such as an animation experience via an animation display device, a haptic experience via a haptic presentation device, etc., to facilitate an enhanced AR experience for the user.

In one embodiment, the user may choose to share the rending of one or more AR experiences, being presented via one or more output components 223 of computing device 100, with other users, such as family, friends, colleagues, etc., as facilitated by AR sharing logic 211. In some embodiments, AR sharing logic 211 may be used to allow for AR experiences to be shared with other computing devices associated with other users over one or more networks, such as a user of computing device 100 may choose to share the rendering of an AR experience at computing device 100 with one or more users of one or more computing devices over one or more networks, such as the Internet, cloud network, proximity network, Bluetooth, etc. Similarly, the user may choose to share the AR experience with other users via one or more software applications, such as by posting the AR experience on one or more social and/or business networking websites (e.g., Facebook®, Twitter®, LinkedIn®, etc.) or sending it to one or more users over one or more email and/or Short Message Service (SMS) applications.

It is to be noted that embodiments provide for real-time AR experiences for users based not only on visual markers (obtained from visual data typically captured through a camera), but through non-visual markers for which the base non-visual data may be obtained without for visual data capturing devices, such as a camera, and that the non-visual data may be obtained using non-visual devices, such as audio sensor, olfactory sensor, haptic sensor, chemical sensor, radio wave sensor, etc. Even visual elements or markers may appear on computing device 100 (e.g., head-mounted display, such as wearable glasses) without the benefit of a camera, such as when a direction of the visual element corresponds to the direction of an audio being obtained from an audio fiducial source. Further, in some embodiments, force sensors (e.g., accelerometers) of capturing/sensing components 221 may be used to accurately position a visual AR experience, such as to keep the visual element or marker in its proper position when the user's head may be turning.

As aforementioned, embodiments are not merely limited to non-visual markers and that they do provide for obtaining and correspondingly employing visual markers (with or without non-visual markers) as facilitated by AR mechanism 110, as desired or necessitated, to render better AR experience for users; however, in one embodiment, this obtaining and employing of visual markers may be performed with or without having to necessarily rely on any of the conventional visual data capturing devices, such as a camera, and instead, in some embodiments, visual markers may be obtained using one or more non-visual devices of capturing/sensing components 221.

For example and in one embodiment, an audio signal, serving as a non-visual marker, may initiate part of an AR experience for the user, but this non-visual marker-based AR experience may then be followed by adding a visual marker to the AR experience; however, this visual marker may be obtained without the use of a camera and instead, the visual marker may be obtained through non-visual data obtained through one or more chemical sensors, sounds sensors, biometric sensors, etc. To further illustrate this point, in continuing with the previous jungle example, when approaching an immersive AR jungle, large insects may appear as flying around in a particular area and any data relating to this event may be determined by detecting an ultrasonic signal (as opposed to an actual visual) associated with the flying around of the large insects and further, this ultrasonic signal may be obtained and a corresponding visual marker may be generated and applied even before the user and/or computing device 100 are able to exact area to have the actual visual of the large insects flying around. Further, for example, the ultrasonic signal may be detected using one or more signal sensors of capturing/sensing components 221 of computing device 100.

Embodiments provide for (without limitation): 1) detecting, via one or more of capturing/sensing components 221, non-visual data (e.g., audible sound, ultrasonic signal, vibration, etc.) and using the detected non-visual data as non-visual fiducial markers for anchoring an AR experience, while the output of the AR experience may be rendered in one or more forms, such as visual, auditory, olfactory, haptic, and/or the like, including the use of localization of the AR experience by detecting non-visual data from various directions; 2) detecting, via one or more of capturing/sensing components 221, chemical properties, including presence of and changes in chemicals, to trigger enhanced AR experiences, where an AR experience may be rendered in one or more forms, such as visual, auditory, olfactory, haptic, and/or the like; 3) detecting, via one or more of capturing/sensing components 221, radio waves (such as even without an authentication connection), including signal directions, radio signal names, etc., to triggered enhanced AR experiences, where an AR experience may be rendered in one or more forms, such as visual, auditory, olfactory, haptic, and/or the like.

Embodiments further provide for (without limitation): 4) initiating an AR experience using one or more of the aforementioned non-visual markers via, in one embodiment, force sensors (e.g., accelerometers, etc.) of capturing/sensing components 221 to anchor visual elements or markers of the AR experience (such as to dampen the movement of visual or auditory AR elements even the user's head may be moving, where the user may be wearing a head-mounting device (e.g., glasses), such as computing device 100, which may also be moving corresponding to the movement of the user's head).

Embodiments further provide for (without limitation): 5) initiating an AR experience using one or more of the aforementioned non-visual markers which may then be followed by the use and application of a visual marker to more accurately anchor the AR experience. Further, in one embodiment, AR experiences may be altered or varied in accordance with the intensity and/or type of non-visual makers and any additional of visual markers along the process.

Embodiments further provide for facilitating any combination of the aforementioned embodiments, as desired or necessitated, such as combining embodiments 1-4, combining embodiments 1-3 with other AR techniques, such as those that may include gestures, voice I/O, eye tracking, etc., and/or the like. Embodiments further provide for the use of context engine 205 to detect user activities, location, social engagements, etc., to allocate appropriate contexts to the visual and non-visual markers and to provide more enhanced and accurate AR experiences.

Communication/compatibility logic 213 may be used to facilitate dynamic communication and compatibility between computing device 100 and any number and type of other computing devices (such as mobile computing device, desktop computer, server computing device, etc.), processing devices (such as central processing unit (CPU), graphics processing unit (GPU), etc.), capturing/sensing components 221 (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, databases and/or data sources 230 (such as data storage device, hard drive, solid-state drive, hard disk, memory card or device, memory circuit, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "non-visual", "visual", "marker", "anchor", "auditory", "olfactory", "haptic", "signal", "chemical", "radio waves", "augmented reality" or "AR", etc., should not be read to limit embodiments to software or devices that carry that label in products or in literature external to this document.

It is contemplated that any number and type of components may be added to and/or removed from AR mechanism 110 to facilitate various embodiments including adding, removing, and/or enhancing certain features. For brevity, clarity, and ease of understanding of AR mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
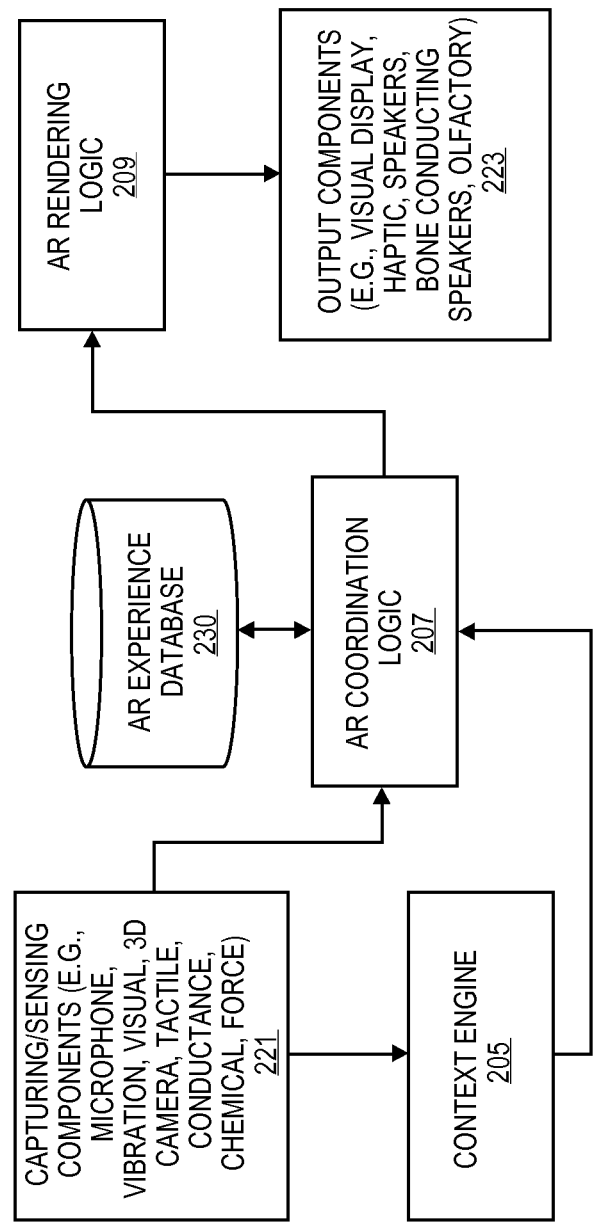
FIG. 2B illustrates a computing device having an architectural placement of a selective set of components according to one embodiment.

FIG. 2B illustrates a computing device 100 having an architectural placement of a selective set of components according to one embodiment. For brevity, many of the details discussed with reference to FIGS. 1 and 2A may not be discussed or repeated hereafter. It is contemplated and to be noted that embodiments are not limited to the illustrated architectural placement, whether it be in terms of the illustrated components or their placement, and that this placement is merely provided as an example for brevity, clarity, and ease understanding.

As illustrated and in one embodiment, capturing/sensing components 221 may be in context engine 205 and further in communication with AR coordination logic 207, where context engine 205 is further in communication with AR coordination logic 207. Further, AR coordination logic 207 may be in communication with AR database 230 and further in communication with AR rendering logic 209 which is shown to be in communication with output components 223 to facilitate the rendering of AR experiences to the user via one or more output components 223 of computing device 100.

FIG. 3A illustrates a method 300 for facilitating generating and rendering of augmented reality experiences based on non-visual markers, such as audio, according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by AR mechanism 110 of FIG. 1. The processes of method 300 are illustrated in linear sequences for brevity and clarity in presentation; however, it is contemplated that any number of them can be performed in parallel, asynchronously, or in different orders. For brevity, many of the details discussed with reference to FIGS. 1 and 2A-B may not be discussed or repeated hereafter.

Method 300 beings with block 301 with having an audio detection device, such as a microphone, of capturing/sensing components 221 of FIG. 2A to detect an audio (such as sound, including specific data in signal, intensity, direction, etc.). At block 303, the detected sound is then mapped by AR coordination logic 207 to AR experience data accessed at AR database 230 of FIG. 2A, where, at block 305, this AR rendering logic 209 may then render an AR experience based on the aforementioned mapping. At block 307, the rendered AR experience may then be presented to the user via a computing device's one or more sensory output channels, such as output components 223 of FIG. 2A, according to its allocated context and/or accessed or detected AR experience data, such as direction, data, intensity, etc., of the detected audio.

In one embodiment, at block 309, a user, who is the recipient of the AR experience at the computing device, may choose to share the AR experience with other users (e.g., family, friends, colleagues, etc.) via one or more other computing devices (e.g., smartphones, wearable devices, etc.) over one or more networks (e.g., Internet, cloud network, Bluetooth, proximity network, etc.) and in any number and type of manners, such as via social networking websites, emails, texts, etc.

At block 311, as further discussed with reference to FIG. 2A, in some embodiments, one or more visual markers may also be detected (such as generating a visual marker from detecting an ultrasonic signal using a signal detector/sensor, etc.) and accordingly, at block 313, these visual markers may be used with the AR experience to further optimize and better and more accurately enhance the AR experience.

FIG. 3B illustrates a method 320 for facilitating generating and rendering of augmented reality experiences based on non-visual markers, such as chemicals, according to one embodiment. Method 320 may be performed by processing logic that may comprise hardware (e.g., circuitry, dedicated logic, programmable logic, etc.), software (such as instructions run on a processing device), or a combination thereof. In one embodiment, method 320 may be performed by AR mechanism 110 of FIG. 1. The processes of method 320 are illustrated in linear sequences for brevity and clarity in presentation; however, it is contemplated that any number of them can be performed in parallel, asynchronously, or in different orders. For brevity, many of the details discussed with reference to FIGS. 1, 2A-B and 3A may not be discussed or repeated hereafter.

Method 300 beings with block 321 with having a chemical sensing device, such as a chemical sensor, of capturing/sensing components 221 of FIG. 2A to detect any chemical and its corresponding properties, changes, characteristics, etc., such as type, intensity, etc., associated with the detected chemical. At block 323, the detected chemical is then mapped by AR coordination logic 207 to AR experience data accessed at AR database 230 of FIG. 2A, where, at block 325, this AR rendering logic 209 may then render an AR experience based on the aforementioned mapping. At block 327, the rendered AR experience may then be presented to the user via a computing device's one or more sensory output channels, such as output components 223 of FIG. 2A, according to its allocated context and/or accessed or detected AR experience data, such as type, intensity, etc., of the detected chemical.

At block 329, as further discussed with reference to FIG. 2A, in some embodiments, one or more visual markers may also be detected (such as generating a visual marker from detecting an ultrasonic signal using a signal detector/sensor, etc.) and accordingly, at block 331, these visual markers may be used with the AR experience to further optimize and better and more accurately enhance the AR experience.

FIG. 3C illustrates a method 340 for facilitating generating and rendering of augmented reality experiences based on non-visual markers, such as wireless signals, according to one embodiment. Method 340 may be performed by processing logic that may comprise hardware (e.g., circuitry, dedicated logic, programmable logic, etc.), software (such as instructions run on a processing device), or a combination thereof. In one embodiment, method 340 may be performed by AR mechanism 110 of FIG. 1. The processes of method 340 are illustrated in linear sequences for brevity and clarity in presentation; however, it is contemplated that any number of them can be performed in parallel, asynchronously, or in different orders. For brevity, many of the details discussed with reference to FIGS. 1, 2A-B and 3A-3B may not be discussed or repeated hereafter.

Method 340 beings with block 341 with having a signal sensing device, such as a signal detector or a wireless subsystem, etc., of capturing/sensing components 221 of FIG. 2A to detect a signal and its corresponding data, intensity, and direction, etc. At block 343, the detected signal then mapped by AR coordination logic 207 to AR experience data accessed at AR database 230 of FIG. 2A, where, at block 345, this AR rendering logic 209 may then render an AR experience based on the aforementioned mapping. At block 347, the rendered AR experience may then be presented to the user via a computing device's one or more sensory output channels, such as output components 223 of FIG. 2A, according to its allocated context and/or accessed or detected AR experience data, such as data, intensity, and direction, etc., of the detected signal.

At block 349, as further discussed with reference to FIG. 2A, in some embodiments, one or more visual markers may also be detected (such as generating a visual marker from detecting an ultrasonic signal using a signal detector/sensor, etc.) and accordingly, at block 351, these visual markers may be used with the AR experience to further optimize and better and more accurately enhance the AR experience.

Figure 4:
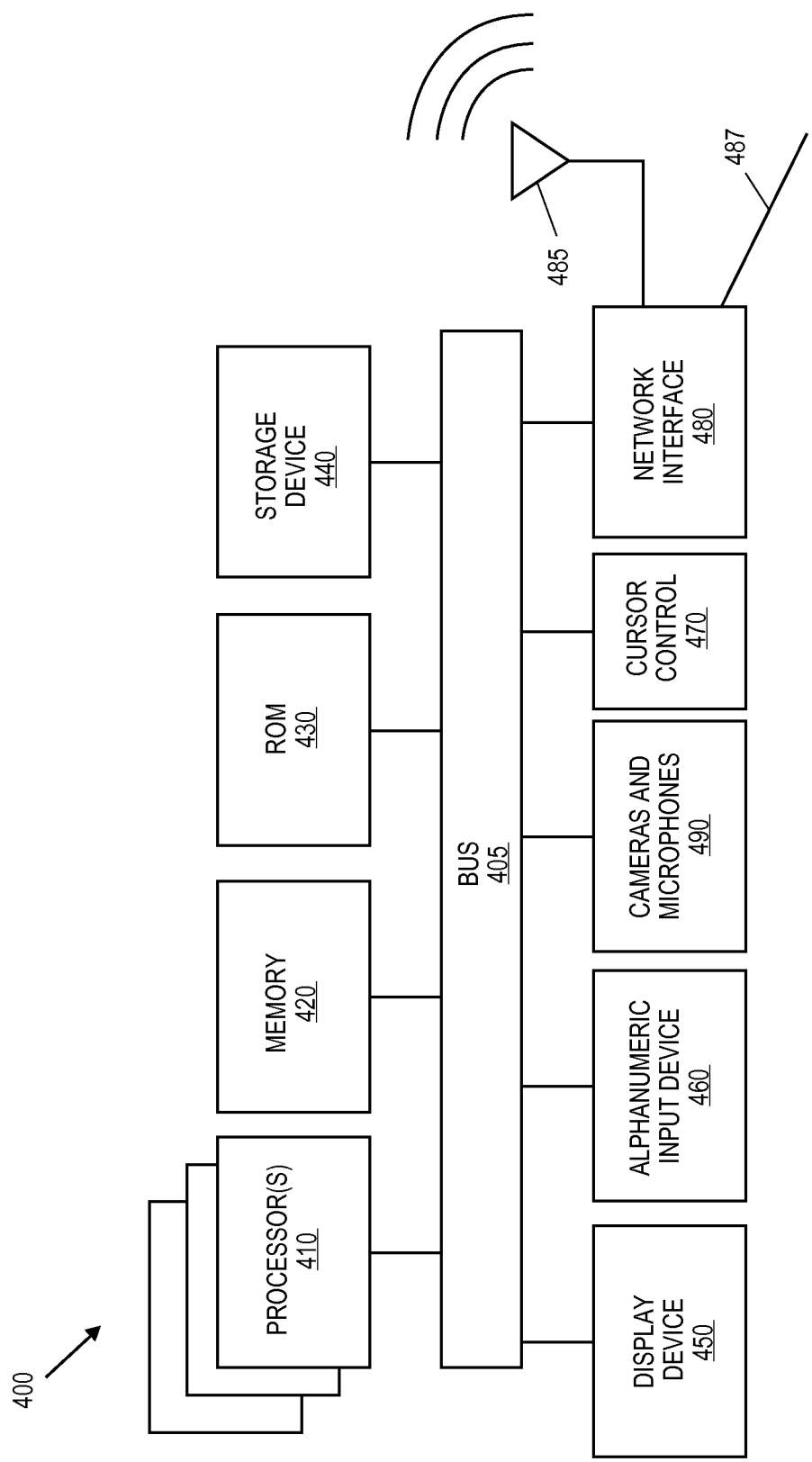
FIG. 4 illustrates computer system suitable for implementing embodiments of the present disclosure according to one embodiment.

FIG. 4 illustrates an embodiment of a computing system 400 capable of supporting the operations discussed above. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 400 may be the same as or similar to or include computing devices 100 described in reference to FIG. 1.

Computing system 400 includes bus 405 (or, for example, a link, an interconnect, or another type of communication device or interface to communicate information) and processor 410 coupled to bus 405 that may process information. While computing system 400 is illustrated with a single processor, it may include multiple processors and/or co-processors, such as one or more of central processors, image signal processors, graphics processors, and vision processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 5:
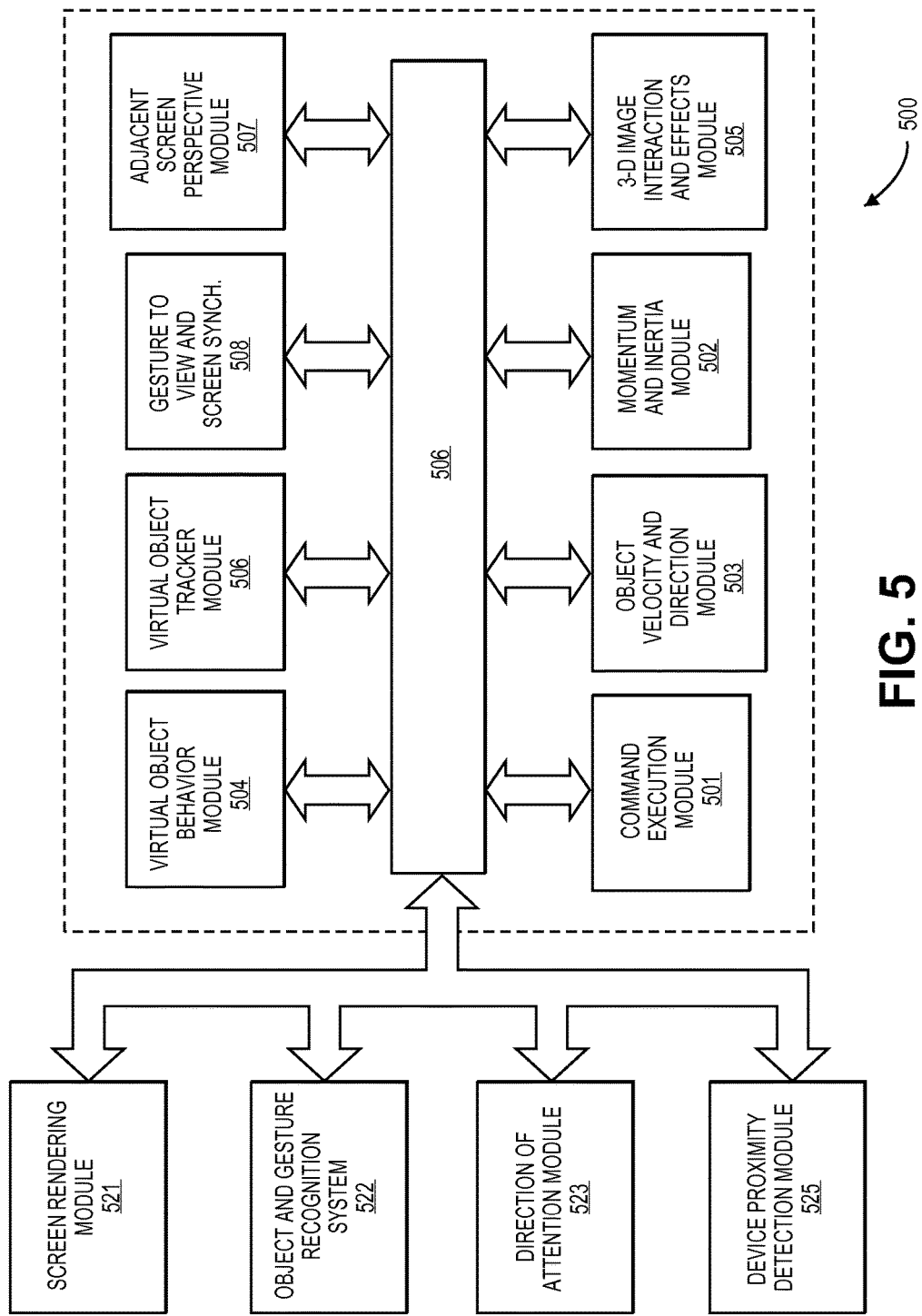
FIG. 5 illustrates computer environment suitable for implementing embodiments of the present disclosure according to one embodiment.

FIG. 5 illustrates an embodiment of a computing environment 500 capable of supporting the operations discussed above. The modules and systems can be implemented in a variety of different hardware architectures and form factors including that shown in FIG. 4.

The Command Execution Module 501 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 521 draws objects on the one or more multiple screens for the user to see. It can be adapted to receive the data from the Virtual Object Behavior Module 504, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 507, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 522 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 523 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 522 to ensure that the gestures or commands are associated with the appropriate library for the active display. Similarly, if the user is looking away from all of the screens, then commands can be ignored.

The Device Proximity Detection Module 525 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 522. For a display device, it may be considered by the Adjacent Screen Perspective Module 507.

The Virtual Object Behavior Module 504 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 506 on the other hand may be adapted to track where a virtual object should be located in three dimensional space in a vicinity of an display, and which body part of the user is holding the virtual object, based on input from the Object and Gesture Recognition Module. The Virtual Object Tracker Module 506 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 508, receives the selection of the view and screen or both from the Direction of Attention Module 523 and, in some cases, voice commands to determine which view is the active view and which screen is the active screen. It then causes the relevant gesture library to be loaded for the Object and Gesture Recognition System 522. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 507, which may include or be coupled to the Device Proximity Detection Module 525, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 507 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 503 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 502 can use image motion, image size, and angle changes of objects in the image plane or in a three-dimensional space to estimate the velocity and direction of objects in the space or on a display.

The Momentum and Inertia Module is coupled to the Object and Gesture Recognition System 522 to estimate the velocity of gestures performed by hands, fingers, and other body parts and then to apply those estimates to determine momentum and velocities to virtual objects that are to be affected by the gesture.

The 3D Image Interaction and Effects Module 505 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate dynamic rendering of non-visual marker-based augmented reality experiences on computing devices, comprising: detection/reception logic to detect non-visual data, wherein the non-visual data is captured via one or more capturing/sensing components; augmented reality coordination logic to map the non-visual data with one or more augmented reality items to generate a first augmented reality experience, wherein the non-visual data is converted into one or more non-visual markers based on the one or more augmented reality items and one or more contexts; and augmented reality rendering logic to render the first augmented reality experience based on the one or more non-visual markers.

Example 2 includes the subject matter of Example 1, further comprising: authentication/verification logic to authenticate the non-visual data; and context engine to allocate the one or more contexts to the non-visual data, wherein the one or more contexts are determined based on one or more of environmental deviations, immediate surroundings, real-time movements, historical events, and calendar events relating to the non-visual data Example 3 includes the subject matter of Example 1 or 2, wherein mapping is performed based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

Example 4 includes the subject matter of Example 1, further comprising one or more output components to present the first augmented reality experience, wherein the one or more output components comprise one or more of a display device, a speaker, an olfactory visualization device, a haptic visualization device, a signal presentation device, and a chemical presentation device.

Example 5 includes the subject matter of Example 1, wherein the one or more capturing/sensing components comprise one or more of an audio sensor, a signal detector, a radio wave detector, a chemical detector, a biometric sensor, and a camera.

Example 6 includes the subject matter of Example 1, wherein the non-visual data comprises one or more of an audio, a chemical, and a signal, wherein the audio includes a sound or a noise, and wherein the signal includes a radio wave.

Example 7 includes the subject matter of Example 1, wherein the detection/reception logic is further to detect visual data via the one or more capturing/sensing components,
wherein the augmented reality coordination logic is further to convent the visual data into one or more visual markers, and generate a second augmented reality experience; and
wherein the augmented reality rendering logic is further to render the second augmented reality experience based on the one or more non-visual markers.

Example 8 includes the subject matter of Example 1 or 7, further comprising augmented reality sharing logic to share the first augmented reality experience or the second augmented reality experience via one or more computing devices or one or more software applications over one or more networks, wherein the one or more software applications include one or more of a social networking website, a business networking website, an email application, and a Short Messaging Service (SMS) application.

Some embodiments pertain to Example 9 that includes a method for facilitating dynamic rendering of non-visual marker-based augmented reality experiences on computing devices, comprising: detecting non-visual data, wherein the non-visual data is captured via one or more capturing/sensing components of a computing device; mapping the non-visual data with one or more augmented reality items to generate a first augmented reality experience, wherein the non-visual data is converted into one or more non-visual markers based on the one or more augmented reality items and one or more contexts; and rendering the first augmented reality experience based on the one or more non-visual markers.

Example 10 includes the subject matter of Example 9, further comprising: authenticating the non-visual data; and allocating the one or more contexts to the non-visual data, wherein the one or more contexts are determined based on one or more of environmental deviations, immediate surroundings, real-time movements, historical events, and calendar events relating to the non-visual data.

Example 11 includes the subject matter of Example 9, wherein mapping is performed based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

Example 12 includes the subject matter of Example 9, further comprising presenting, via one or more output components, the first augmented reality experience, wherein the one or more output components comprise one or more of a display device, a speaker, an olfactory visualization device, a haptic visualization device, a signal presentation device, and a chemical presentation device.

Example 13 includes the subject matter of Example 9, wherein the one or more capturing/sensing components comprise one or more of an audio sensor, a signal detector, a radio wave detector, a chemical detector, a biometric sensor, and a camera.

Example 14 includes the subject matter of Example 9, wherein the non-visual data comprises one or more of an audio, a chemical, and a signal, wherein the audio includes a sound or a noise, and wherein the signal includes a radio wave.

Example 15 includes the subject matter of Example 9, further comprising: detecting visual data via the one or more capturing/sensing components of the computing device; converting the visual data into one or more visual markers, and generate a second augmented reality experience; and rendering the second augmented reality experience based on the one or more non-visual markers.

Example 16 includes the subject matter of Example 9, further comprising sharing the first augmented reality experience or the second augmented reality experience via one or more computing devices or one or more software applications over one or more networks, wherein the one or more software applications include one or more of a social networking website, a business networking website, an email application, and a Short Messaging Service (SMS) application.

Example 17 includes at least one machine-readable medium comprising a plurality of instructions, when executed on a computing device, to implement or perform a method or realize an apparatus as claimed in any preceding claims.

Example 18 includes at least one non-transitory or tangible machine-readable medium comprising a plurality of instructions, when executed on a computing device, to implement or perform a method or realize an apparatus as claimed in any preceding claims.

Example 19 includes a system comprising a mechanism to implement or perform a method or realize an apparatus as claimed in any preceding claims.

Example 20 includes an apparatus comprising means for performing a method as claimed in any preceding claims.

Example 21 includes a computing device arranged to implement or perform a method or realize an apparatus as claimed in any preceding claims.

Example 22 includes a communications device arranged to implement or perform a method or realize an apparatus as claimed in any preceding claims.

Some embodiments pertain to Example 23 includes a system comprising a storage device having instructions, and a processor to execute the instructions to facilitate a mechanism to perform one or more operations comprising: detecting non-visual data, wherein the non-visual data is captured via one or more capturing/sensing components of a computing device; mapping the non-visual data with one or more augmented reality items to generate a first augmented reality experience, wherein the non-visual data is converted into one or more non-visual markers based on the one or more augmented reality items and one or more contexts; and rendering the first augmented reality experience based on the one or more non-visual markers.

Example 24 includes the subject matter of Example 23, wherein the one or more operations further comprise authenticating the non-visual data; and allocating the one or more contexts to the non-visual data, wherein the one or more contexts are determined based on one or more of environmental deviations, immediate surroundings, real-time movements, historical events, and calendar events relating to the non-visual data.

Example 25 includes the subject matter of Example 23, wherein mapping is performed based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

Example 26 includes the subject matter of Example 23, wherein the one or more operations further comprise presenting, via one or more output components, the first augmented reality experience, wherein the one or more output components comprise one or more of a display device, a speaker, an olfactory visualization device, a haptic visualization device, a signal presentation device, and a chemical presentation device.

Example 27 includes the subject matter of Example 23, wherein the one or more capturing/sensing components comprise one or more of an audio sensor, a signal detector, a radio wave detector, a chemical detector, a biometric sensor, and a camera.

Example 28 includes the subject matter of Example 23, wherein the non-visual data comprises one or more of an audio, a chemical, and a signal, wherein the audio includes a sound or a noise, and wherein the signal includes a radio wave.

Example 29 includes the subject matter of Example 23, wherein the one or more operations further comprise: detecting visual data via the one or more capturing/sensing components of the computing device; converting the visual data into one or more visual markers, and generate a second augmented reality experience; and rendering the second augmented reality experience based on the one or more non-visual markers.

Example 30 includes the subject matter of Example 23, wherein the one or more operations further comprise sharing the first augmented reality experience or the second augmented reality experience via one or more computing devices or one or more software applications over one or more networks, wherein the one or more software applications include one or more of a social networking website, a business networking website, an email application, and a Short Messaging Service (SMS) application.

Some embodiments pertain to Example 31 includes an apparatus comprising: means for detecting non-visual data, wherein the non-visual data is captured via one or more capturing/sensing components of a computing device; means for mapping the non-visual data with one or more augmented reality items to generate a first augmented reality experience, wherein the non-visual data is converted into one or more non-visual markers based on the one or more augmented reality items and one or more contexts; and means for rendering the first augmented reality experience based on the one or more non-visual markers.

Example 32 includes the subject matter of Example 31, further comprising: means for authenticating the non-visual data; and means for allocating the one or more contexts to the non-visual data, wherein the one or more contexts are determined based on one or more of environmental deviations, immediate surroundings, real-time movements, historical events, and calendar events relating to the non-visual data.

Example 33 includes the subject matter of Example 31, wherein mapping is performed based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

Example 34 includes the subject matter of Example 31, further comprising means for presenting, via one or more output components, the first augmented reality experience, wherein the one or more output components comprise one or more of a display device, a speaker, an olfactory visualization device, a haptic visualization device, a signal presentation device, and a chemical presentation device.

Example 35 includes the subject matter of Example 31, wherein the one or more capturing/sensing components comprise one or more of an audio sensor, a signal detector, a radio wave detector, a chemical detector, a biometric sensor, and a camera.

Example 36 includes the subject matter of Example 31, wherein the non-visual data comprises one or more of an audio, a chemical, and a signal, wherein the audio includes a sound or a noise, and wherein the signal includes a radio wave.

Example 37 includes the subject matter of Example 31, further comprising: means for detecting visual data via the one or more capturing/sensing components of the computing device; means for converting the visual data into one or more visual markers, and generate a second augmented reality experience; and means for rendering the second augmented reality experience based on the one or more non-visual markers.

Example 38 includes the subject matter of Example 31, further comprising means for sharing the first augmented reality experience or the second augmented reality experience via one or more computing devices or one or more software applications over one or more networks, wherein the one or more software applications include one or more of a social networking website, a business networking website, an email application, and a Short Messaging Service (SMS) application.

Some embodiments pertain to Example 39 includes a system comprising: a computing system having a processing device and a memory, the computing system further comprises: object and gesture recognition system, via one or more capturing/sensing components, to detect non-visual data, wherein the non-visual data is captured via one or more capturing/sensing components; device proximity detection module to map the non-visual data with one or more augmented reality items to generate a first augmented reality experience, wherein the non-visual data is converted into one or more non-visual markers based on the one or more augmented reality items and one or more contexts; and screen rendering module to render the first augmented reality experience based on the one or more non-visual markers.

Example 40 includes the subject matter of Example 39, further comprising context engine to allocate the one or more contexts to the non-visual data, wherein the one or more contexts are determined based on one or more of environmental deviations, immediate surroundings, real-time movements, historical events, and calendar events relating to the non-visual data, wherein mapping is performed based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

Example 41 includes the subject matter of Example 39, further comprising 3D image interaction and affects module to, via one or more output components, present the first augmented reality experience, wherein the one or more output components comprise one or more of a display device, a speaker, an olfactory visualization device, a haptic visualization device, a signal presentation device, and a chemical presentation device, wherein the one or more capturing/sensing components comprise one or more of an audio sensor, a signal detector, a radio wave detector, a chemical detector, a biometric sensor, and a camera.

Example 42 includes the subject matter of Example 39, wherein the non-visual data comprises one or more of an audio, a chemical, and a signal, wherein the audio includes a sound or a noise, and wherein the signal includes a radio wave, wherein the object and gesture recognition system is further to detect visual data via the one or more capturing/sensing components, wherein the augmented reality coordination logic is further to convent the visual data into one or more visual markers, and generate a second augmented reality experience, and wherein the augmented reality rendering logic is further to render the second augmented reality experience based on the one or more non-visual markers.

Example 43 includes the subject matter of Example 39, wherein the screen rendering module is further to, via augmented reality sharing logic, share the first augmented reality experience or the second augmented reality experience via one or more computing devices or one or more software applications over one or more networks, wherein the one or more software applications include one or more of a social networking website, a business networking website, an email application, and a Short Messaging Service (SMS) application.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   detection/reception logic to detect non-visual data, wherein the non-visual data is captured via one or more capturing/sensing components and related to a reality experience;
   authentication/verification logic to verify a source of origin or transmission of the non-visual data including source of origin or transmission type such as a person, animal, device or inanimate object as one or more non-visual markers, the non-visual markers to mark the reality experience for augmentation based on one or more contexts into a first augmented reality experience;
   augmented reality coordination logic to map the non-visual data verified as one or more non-visual markers with one or more augmented reality items stored in a database to generate the first augmented reality experience using the augmented reality items for a new reality experience; and
   augmented reality rendering logic to render the first augmented reality experience, wherein the first augmented reality experience is rendered based on the one or more non-visual markers and augmented reality items.

2. The apparatus of claim 1, further comprising:
   context engine to allocate the one or more contexts to the non-visual data, wherein the one or more contexts are determined based on one or more of environmental deviations, immediate surroundings, real-time movements, historical events, and calendar events relating to the non-visual data.

3. The apparatus of claim 1, wherein the augmented reality coordination logic is to map the non-visual data based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

4. The apparatus of claim 1, further comprising one or more output components to present the first augmented reality experience, wherein the one or more output components comprise one or more of a display device, a speaker, an olfactory visualization device, a haptic visualization device, a signal presentation device, and a chemical presentation device.

5. The apparatus of claim 1, wherein the one or more capturing/sensing components comprise one or more of an audio sensor, a signal detector, a radio wave detector, a chemical detector, a biometric sensor, and a camera.

6. The apparatus of claim 1, wherein the non-visual data comprises one or more of an audio, a chemical, and a signal, wherein the audio includes a sound or a noise, and wherein the signal includes a radio wave.

7. The apparatus of claim 1, wherein the detection/reception logic is further to detect visual data via the one or more capturing/sensing components,
   wherein the augmented reality coordination logic is further to convent the visual data into one or more visual markers, and generate a second augmented reality experience, and
   wherein the augmented reality rendering logic is further to render the second augmented reality experience based on the one or more non-visual markers and augmented reality items.

8. The apparatus of claim 1, further comprising:
   augmented reality sharing logic to share the first augmented reality experience or the second augmented reality experience via one or more computing devices or one or more software applications over one or more networks, wherein the one or more software applications include one or more of a social networking website, a business networking website, an email application, and a Short Messaging Service (SMS) application; and
   communication/compatibility logic to establish communication with one or more of the one or more computing devices, the one or more software applications, and the one or more networks.

9. A method comprising:
   detecting, by one or more capturing/sensing components of a computing device, non-visual data related to a reality experience;
   verifying a source of origin or transmission of the non-visual data including source of origin or transmission type such as a person, animal, device or inanimate object as one or more non-visual markers, the non-visual markers to mark the reality experience for augmentation based on one or more contexts into a first augmented reality experience;
   mapping, by the computing device, the non-visual data verified as one or more non-visual markers with one or more augmented reality items stored in a database to generate the first augmented reality experience using the augmented reality items for a new reality experience; and
   rendering, by the computing device, the first augmented reality experience, wherein the first augmented reality experience is rendered based on the one or more non-visual markers and augmented reality items.

10. The method of claim 9, further comprising:
    allocating, by the computing device, the one or more contexts to the non-visual data, wherein the one or more contexts are determined based on one or more of environmental deviations, immediate surroundings, real-time movements, historical events, and calendar events relating to the non-visual data.

11. The method of claim 9, wherein mapping the non-visual data is based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

12. The method of claim 9, further comprising presenting, via one or more output components of the computing device, the first augmented reality experience, wherein the one or more output components comprise one or more of a display device, a speaker, an olfactory visualization device, a haptic visualization device, a signal presentation device, and a chemical presentation device.

13. The method of claim 9, wherein the one or more capturing/sensing components comprise one or more of an audio sensor, a signal detector, a radio wave detector, a chemical detector, a biometric sensor, and a camera.

14. The method of claim 9, wherein the non-visual data comprises one or more of an audio, a chemical, and a signal, wherein the audio includes a sound or a noise, and wherein the signal includes a radio wave.

15. The method of claim 9, further comprising:
detecting, by the computing device, visual data via the one or more capturing/sensing components of the computing device;
converting, by the computing device, the visual data into one or more visual markers, and generate a second augmented reality experience; and
rendering, by the computing device, the second augmented reality experience based on the one or more non-visual markers and augmented reality items.

16. The method of claim 9, further comprising:
sharing, by the computing device, the first augmented reality experience or the second augmented reality experience via one or more computing devices or one or more software applications over one or more networks, wherein the one or more software applications include one or more of a social networking website, a business networking website, an email application, and a Short Messaging Service (SMS) application; and
establishing, by the computing device, communication with one or more of the one or more computing devices, the one or more software applications, and the one or more networks.

17. At least one non-transitory machine-readable medium comprising a plurality of instructions, executed on a computing device, to facilitate the computing device to perform one or more operations comprising:
detecting non-visual data, wherein the non-visual data is captured via one or more capturing/sensing components and related to a reality experience;
verifying a source of origin or transmission of the non-visual data including source of origin or transmission type such as a person, animal, device or inanimate object as one or more non-visual markers, the non-visual markers to mark the reality experience for augmentation based on one or more contexts into a first augmented reality experience;
mapping the non-visual data verified as one or more non-visual markers with one or more augmented reality items stored in a database to generate the first augmented reality experience using the augmented reality items for a new reality experience; and
rendering the first augmented reality experience, wherein the first augmented reality experience is rendered based on the one or more non-visual markers and augmented reality items.

18. The non-transitory machine-readable medium of claim 17, wherein the one or more operations comprise:
allocating the one or more contexts to the non-visual data, wherein the one or more contexts are determined based on one or more of environmental deviations, immediate surroundings, real-time movements, historical events, and calendar events relating to the non-visual data.

19. The non-transitory machine-readable medium of claim 17, wherein mapping the non-visual data is based on one or more of local laws, a set of rules, predetermined criteria, and the one or more contexts, wherein the database to store one or more of the local laws, the set of rules, the predetermined criteria, and the one or more contexts, wherein the database is further to store the one or more augmented reality items including one or more of animation characters, two-dimension (2D) models, three-dimension (3D) models, and historical contents relating to the non-visual data.

20. The non-transitory machine-readable medium of claim 17, wherein the one or more operations comprise presenting, via one or more output components, the first augmented reality experience, wherein the one or more output components comprise one or more of a display device, a speaker, an olfactory visualization device, a haptic visualization device, a signal presentation device, and a chemical presentation device.

21. The non-transitory machine-readable medium of claim 17, wherein the one or more capturing/sensing components comprise one or more of an audio sensor, a signal detector, a radio wave detector, a chemical detector, a biometric sensor, and a camera.

22. The non-transitory machine-readable medium of claim 17, wherein the non-visual data comprises one or more of an audio, a chemical, and a signal, wherein the audio includes a sound or a noise, and wherein the signal includes a radio wave.

23. The non-transitory machine-readable medium of claim 17, wherein the one or more operations comprise:
detecting visual data via the one or more capturing/sensing components;
converting the visual data into one or more visual markers, and generate a second augmented reality experience; and
rendering the second augmented reality experience based on the one or more non-visual markers and augmented reality items.

24. The non-transitory machine-readable medium of claim 17, wherein the one or more operations comprise:
sharing the first augmented reality experience or the second augmented reality experience via one or more computing devices or one or more software applications over one or more networks, wherein the one or more software applications include one or more of a social networking website, a business networking website, an email application, and a Short Messaging Service (SMS) application; and
establishing communication with or between one or more of the one or more computing devices, the one or more software applications, and the one or more networks.

* * * * *